US010193890B2

(12) United States Patent
Uchizumi et al.

(10) Patent No.: US 10,193,890 B2
(45) Date of Patent: Jan. 29, 2019

(54) COMMUNICATION APPARATUS TO MANAGE WHITELIST INFORMATION

(71) Applicant: ALAXALA Networks Corporation, Kawasaki-shi, Kanagawa (JP)

(72) Inventors: Keigo Uchizumi, Kawasaki (JP); Hiroki Yano, Kawasaki (JP); Yoshifumi Atarashi, Kawasaki (JP)

(73) Assignee: Alaxala Networks Corporation, Kanagawa (JP)

( * ) Notice: Subject to any disclaimer, the term of this patent is extended or adjusted under 35 U.S.C. 154(b) by 220 days.

(21) Appl. No.: 15/230,511

(22) Filed: Aug. 8, 2016

(65) Prior Publication Data

US 2017/0063861 A1 Mar. 2, 2017

(30) Foreign Application Priority Data

Aug. 26, 2015 (JP) .................................. 2015-166671

(51) Int. Cl.
*H04L 29/06* (2006.01)

(52) U.S. Cl.
CPC ........ *H04L 63/101* (2013.01); *H04L 63/0236* (2013.01); *H04L 63/0245* (2013.01); *H04L 63/1441* (2013.01); *H04L 69/22* (2013.01)

(58) Field of Classification Search
CPC ............. H04L 63/0227; H04L 63/0236; H04L 63/0245; H04L 63/10; H04L 63/101; H04L 63/104
See application file for complete search history.

(56) References Cited

U.S. PATENT DOCUMENTS

| 7,617,533 | B1 * | 11/2009 | Hernacki | H04L 63/1441 726/22 |
| 8,881,276 | B2 * | 11/2014 | Kratzer | G06F 21/55 713/100 |
| 9,305,159 | B2 * | 4/2016 | Fanton | G06F 21/10 |
| 2006/0150256 | A1 * | 7/2006 | Fanton | G06F 21/10 726/27 |
| 2008/0168558 | A1 * | 7/2008 | Kratzer | G06F 21/55 726/23 |
| 2009/0286509 | A1 * | 11/2009 | Huber | G06Q 20/1235 455/410 |
| 2010/0112980 | A1 * | 5/2010 | Horn | H04W 48/20 455/411 |

(Continued)

FOREIGN PATENT DOCUMENTS

| JP | 2009-239525 A | 10/2009 |
| JP | 2015-050767 A | 3/2015 |

*Primary Examiner* — Eric W Shepperd
(74) *Attorney, Agent, or Firm* — Mattingly & Malur, PC

(57) ABSTRACT

A communication apparatus receives control information of first data and a plurality of types of header information of first data, the first data being received by a first data receiver; selects a parameter from the plurality of types of header information of the first data based on a priority of a first data receiver group to which the first data receiver belongs and a storage condition, the priority being indicated by priority information, the storage condition indicating the number of entries of a whitelist that can be stored in a whitelist storage first memory; and add, to the whitelist, an entry that includes control information of the first data and at least one parameter selected above.

10 Claims, 12 Drawing Sheets

(56) References Cited

U.S. PATENT DOCUMENTS

| | | | |
|---|---|---|---|
| 2010/0112981 A1* | 5/2010 | Suh | H04W 48/14 455/411 |
| 2011/0145920 A1* | 6/2011 | Mahaffey | G06F 21/564 726/22 |
| 2015/0067764 A1* | 3/2015 | Kim | H04L 63/0227 726/1 |
| 2015/0288715 A1* | 10/2015 | Hotchkiss | H04L 63/0876 726/7 |
| 2017/0196012 A1* | 7/2017 | Takano | H04W 72/0453 |

* cited by examiner

| | 701 | 702 | 703 | 704 | 705 | 706 | 707 | 708 | 709 |
|---|---|---|---|---|---|---|---|---|---|
| 1 | PACKET RECEIVER NUMBER | VLAN NUMBER | SOURCE MAC ADDRESS | DESTINATION MAC ADDRESS | PROTOCOL | SOURCE IP ADDRESS | DESTINATION IP ADDRESS | SOURCE PORT NUMBER | DESTINATION PORT NUMBER |
| 2 | PACKET RECEIVER NUMBER | VLAN NUMBER | SOURCE MAC ADDRESS | DESTINATION MAC ADDRESS | PROTOCOL | SOURCE IP ADDRESS | DESTINATION IP ADDRESS | SOURCE PORT NUMBER | DESTINATION PORT NUMBER |
| ... | . . . . . | | | | | | | | |
| N | PACKET RECEIVER NUMBER | VLAN NUMBER | SOURCE MAC ADDRESS | DESTINATION MAC ADDRESS | PROTOCOL | SOURCE IP ADDRESS | DESTINATION IP ADDRESS | SOURCE PORT NUMBER | DESTINATION PORT NUMBER |

| STORED INFORMATION | STORED CONTENT | INITIAL STATE | |
|---|---|---|---|
| WHITELIST FUNCTION | WHITELIST SWITCH MODE/ NORMAL SWITCH MODE | NORMAL SWITCH MODE | 504 |
| WHITELIST FUNCTION STATE | GENERATING STATE/ OPERATING STATE | OPERATING STATE | 505 |
| OPERATION FOR WHITELIST UNREGISTERED PACKET | DISCARD/ ALLOW THROUGH/ TRANSFER TO SPECIFIC PACKET TRANSMITTER | ALLOW THROUGH | 506 |
| OUTPUT LOG FOR WHITELIST UNREGISTERED PACKET | ENABLED/ DISABLED | DISABLED | 507 |
| SETTINGS FOR WHITELIST NON-APPLICABLE PACKET RECEIVER | PACKET RECEIVER #1 APPLICABLE/NON-APPLICABLE<br><br>PACKET RECEIVER #2 APPLICABLE/NON-APPLICABLE<br><br>. . .<br><br>PACKET RECEIVER #n APPLICABLE/NON-APPLICABLE | ALL PACKET RECEIVERS ARE APPLICABLE | 508 |
| OUTPUT ENTRY INTEGRATION LOG | ENABLED/ DISABLED | DISABLED | 509 |

Column headers numbered 501, 502, 503.

FIG. 5

| COMMAND TYPE | SETTING CONTENT | INITIAL STATE | |
|---|---|---|---|
| WHITELIST FUNCTION SETTING | WHITELIST SWITCH MODE/ NORMAL SWITCH MODE | NORMAL SWITCH MODE | 1104 |
| WHITELIST FUNCTION STATE SETTING | GENERATING STATE/ OPERATING STATE | OPERATING STATE | 1105 |
| OPERATION SETTING FOR WHITELIST UNREGISTERED PACKET | DISCARD/ALLOW THROUGH/ TRANSFER TO SPECIFIC PACKET TRANSMITTER | ALLOW THROUGH | 1106 |
| LOG OUTPUT SETTING FOR WHITELIST UNREGISTERED PACKET | ENABLED/ DISABLED | DISABLED | 1107 |
| SETTINGS FOR WHITELIST NON-APPLICABLE PACKET RECEIVER | PACKET RECEIVER #1 APPLICABLE/NON-APPLICABLE<br><br>PACKET RECEIVER #2 APPLICABLE/NON-APPLICABLE<br><br>. . .<br><br>PACKET RECEIVER #n APPLICABLE/NON-APPLICABLE | ALL PACKET RECEIVERS ARE APPLICABLE | 1108 |
| OUTPUT ENTRY INTEGRATION LOG | ENABLED/ DISABLED | DISABLED | 1109 |
| PRIORITY SETTING FOR EACH PACKET RECEIVER | 1~10 | 1 | 1110 |
| GENERATED WHITELIST INFORMATION DISPLAY | - | - | 1111 |

White-list Warning :Received suspicious Packet
Receive Port:0/1   Vlan:1   SMAC:00:00:00:00:00:xx   DMAC:00:00:00:00:00:yy
           Protocol:tcp   SIP:192.168.0.xxx   DIP:192.168.0.yyy   Sport:100   Dport:200

White-list Notice :Carried out the integration on the White-list
Integration Port:0/1   Integration Parameter:Dport   entry count:50

*FIG. 7B*

| # show White-list | | | | | | | | | | |
|---|---|---|---|---|---|---|---|---|---|---|
| # Receive Port | Vlan | SMAC | DMAC | Protocol | SIP | DIP | Sport | Dport | matched packets |
| #1 0/1 | 1 | 00:00:00:00:00:01 | 00:00:00:00:00:11 | tcp | 192.168.1.1 | 192.168.1.11 | 101 | D | 602 |
| #2 0/2 | 2 | 00:00:00:00:00:02 | 00:00:00:00:00:12 | udp | 192.168.2.2 | 192.168.2.12 | D | 2000 | 109 |
| #3 0/5 | 3 | 00:00:00:00:00:03 | 00:00:00:00:00:13 | tcp | 192.168.3.3 | 192.168.3.13 | 2002 | 3012 | 6 |
| #4 0/1 | 1 | 00:00:00:00:00:01 | 00:00:00:00:00:11 | tcp | 192.168.1.1 | 192.168.1.11 | 1300 | D | 10003 |
| #5 0/2 | 2 | 00:00:00:00:00:04 | 00:00:00:00:00:15 | udp | 192.168.2.4 | 192.168.2.15 | D | 1200 | 12354 |
| #6 0/16 | 16 | 00:00:00:00:00:05 | 00:00:00:00:00:16 | tcp | 192.168.16.5 | 192.168.16.16 | 1928 | 2267 | 80 |
| #7 0/12 | 12 | 00:00:00:00:00:06 | 00:00:00:00:00:17 | D | 192.168.12.6 | 192.168.12.17 | D | D | 4587 |
| #7 0/12 | 12 | 00:00:00:00:00:07 | 00:00:00:00:00:18 | D | 192.168.12.7 | 192.168.12.18 | D | D | 1246 |
| #9 0/13 | 13 | 00:00:00:00:00:08 | 00:00:00:00:00:19 | tcp | 192.168.13.8 | 192.168.13.19 | 9002 | 7092 | 2121 |

| PACKET RECEIVER NUMBER | VLAN NUMBER | SOURCE MAC ADDRESS | DESTINATION MAC ADDRESS | PROTOCOL | SOURCE IP ADDRESS | DESTINATION IP ADDRESS | SOURCE PORT NUMBER | DESTINATION PORT NUMBER |
|---|---|---|---|---|---|---|---|---|
| 2 | 2 | 00:00:00:00:00:02 | 00:00:00:00:00:12 | UDP | 192.168.2.2 | 192.168.2.12 | 201 | 2000 |
| 2 | 2 | 00:00:00:00:00:03 | 00:00:00:00:00:12 | UDP | 192.168.2.3 | 192.168.2.12 | 50 | 2000 |

1301, 1302

*FIG. 11*

COMMUNICATION APPARATUS TO MANAGE WHITELIST INFORMATION

CLAIM OF PRIORITY

The present application claims priority from Japanese patent application JP 2015-166671 filed on Aug. 26, 2015, the content of which is hereby incorporated by reference into this application.

BACKGROUND

The present invention relates to a communication apparatus.

In recent years, there are many incidents where an attacker intrudes a network in a critical infrastructure such as a power plant and takes over the control of the system. The network of the critical infrastructure is protected by a firewall device or anti-virus software or the like installed in a terminal such as a personal computer, but it has not been possible to completely prevent the intrusion of an attacker attempting to take over the control of the system. Examples of a method to mitigate the risk caused by the intrusion of an attacker include a use of the whitelist function. The whitelist function is to enhance the security level by registering, in a whitelist storage device, authorized terminal information included in the information of authorized communications that flow through the network, and blocking any unauthorized communications other than communications from authorized terminals registered in the whitelist storage device.

Prior art documents of this art include JP2009-239525 A (Patent Document 1), and JP2015-050767 A (Patent Document 2). Patent Document 1 describes that "a packet filtering device receives a packet sent from an SIP server, determines whether the received packet is a response to a verification request sent from an SIP client at a predetermined time interval, and if the packet is a response to the verification request and if sender information of the packet is not saved in a whitelist, obtains and stores the sender information of the packet in the whitelist. If network congestion is detected, the packet filtering device receives packets on the network, and transfers the packets that have the sender information thereof saved in the whitelist preferentially to the packets that do not have the sender information thereof stored in the whitelist, among the received packets." (See Abstract)

Patent Document 2 describes that "a network switch includes: a whitelist monitoring part that has stored therein a whitelist including allowable communication rules and that monitors at least one packet input through a plurality of switch interfaces based on the whitelist, the whitelist monitoring part allowing communications of packets that comply with the whitelist; and a whitelist management part that updates the whitelist and sends the whitelist to the whitelist monitoring part." (See Abstract)

SUMMARY OF THE INVENTION

In the art described in Patent Document 1, the packet filtering device registers, in the whitelist, entries that only include information of senders of the packets. Thus, with the art described in Patent Document 1, if an authorized terminal that is registered as a sender is infected with malware and performs malice communications, or if a malicious user has access to the authorized terminal, it is not possible to prevent the attack.

In the art described in Patent Document 2, the network switch has a whitelist that contains entries each including a plurality of types of information, such as sender, destination, and protocol, in order to prevent an attack in the situations described above. However, when the number of types of information included in each entry increases, the number of entries in the whitelist is likely to increase.

Because the capacity of a memory installed in a general packet relay device is limited, the number of entries of the whitelist that can be stored in the memory (may also be referred to as a storage condition below) is also limited. Therefore, in the art described in Patent Document 2, the number of entries in the whitelist may reach the storage condition, which makes it impossible for the whitelist to maintain a desired security level.

In order to solve this problem, in one aspect, the present invention provides a communication apparatus that generates a whitelist with a high security level corresponding to the storage condition and ensuring the security level of communications.

The present invention has, for example, the following configuration to solve the above-mentioned problem. A communication apparatus connected to a network comprising a plurality of data receivers that are configured to receive data from the network, wherein each of the plurality of data receivers belongs to a data receiver group made up of at least one data receiver, and adds, to the received data, control information indicating a data receiver group to which the data receiver belongs, wherein the communication apparatus further includes: a controller configured to generate a whitelist based on data received by each of the plurality of data receivers; priority information indicating a priority of each data receiver group; and a whitelist storage first memory that stores therein the whitelist, and wherein the controller is configured to: receive control information of first data and a plurality of types of header information of the first data, the first data being received by a first data receiver; select a parameter from the plurality of types of header information of the first data based on a priority of a first data receiver group to which the first data receiver belongs and a storage condition, the priority being indicated by the priority information, the storage condition indicating the number of entries of a whitelist that can be stored in the whitelist storage first memory; and add, to the whitelist, an entry that includes control information of the first data and at least one parameter selected above.

According to one aspect of the present invention, it is possible to provide a communication apparatus that generates a whitelist with a high security level corresponding to the storage condition and the security level of communications.

BRIEF DESCRIPTIONS OF DRAWINGS

The present invention can be appreciated by the description which follows in conjunction with the following figures, wherein:

FIG. 2 is an example of a whitelist according to Embodiment 1;

FIG. 5 is an example of transfer setting information stored in a transfer setting memory according to Embodiment 1;

FIG. 6 is an example of a list of commands related to transfer settings, which are received by a transfer setting program through an input/output device according to Embodiment 1;

FIG. 7A is an example of a log for a whitelist unregistered packet according to Embodiment 1;

FIG. 7B is an example of an entry integration log according to Embodiment 1;

FIG. 7C is an example of a whitelist log according to Embodiment 1;

FIG. 11 is an example of packet information generated by a destination determining part according to Embodiment 1.

DETAILED DESCRIPTION OF THE PREFERRED EMBODIMENTS

Embodiment 1

Figure 1:
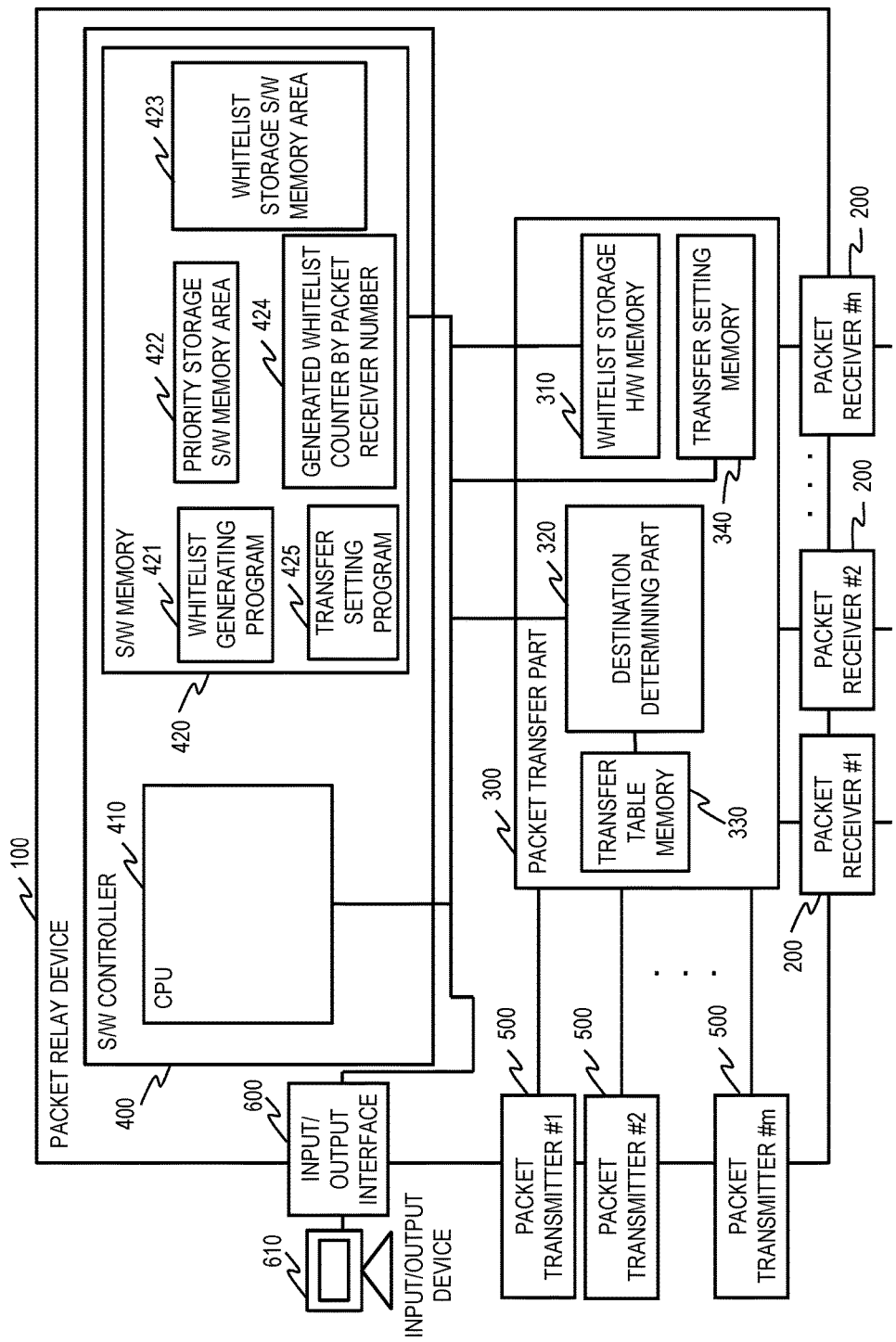
FIG. 1 is a block diagram depicting a configuration example of a packet relay device according to Embodiment 1.

FIG. 1 is a block diagram depicting a configuration example of a packet relay device that relays a packet, which is an example of data. A packet relay device 100 is an example of the communication apparatus. The packet relay device 100 relays packets and generates a whitelist. The whitelist is a list of packets that are allowed to be relayed (transferred) and communicated by the packet relay device 100 (approved sender list).

The packet relay device 100 includes a plurality of packet receivers 200, a packet transfer part 300, an S/W (software) controller 400, a plurality of packet transmitters 500, and an input/output interface 600, for example, and the respective members are connected to each other via internal buses.

The packet receivers 200 are each connected to an external device, such as a terminal or another packet relay device, via a communication line, such as a metal cable or optical cable, and receive packets from the connected external device. Each of the packet receivers 200 has a receiver number that uniquely identifies a packet receiver 200.

When a packet is received, each packet receiver 200 adds, to the packet, control information that corresponds to the packet receiver 200. The control information indicates a packet receiver group made up of at least one packet receiver 200. Examples of the control information added by the packet receiver 200 include the packet receiver number of the packet receiver 200, and a virtual local area network (VLAN) number that is an identifier of the VLAN to which the packet receiver 200 belongs.

The packet transfer part 300 receives packets from the packet receivers 200, and transfers or discards the received packets according to the whitelist generated by the S/W controller 400. The S/W controller 400 generates a whitelist. The packet transmitters 500 are each connected to an external device, such as a terminal or another packet relay device via a communication line such as a metal cable or optical cable, and transmit the packets received from the packet transfer part 300 to the connected external device.

The packet receivers 200 and the packet transmitters 500 are generally constituted of hardware. In FIG. 1, the packet receivers 200 and the packet transmitters 500 are separate parts, but alternatively a packet transmitter-receiver having the functions of the packet receiver 200 and the packet transmitter 500 may be used.

The input/output interface 600 is connected to an input/output device 610. The input/output interface 600 receives an input from a user through the input/output device 610. The input/output interface 600 also outputs performance results of the programs and the like to the input/output device 610. The input/output device 610 includes a keyboard, mouse, and the like as an input device for receiving an input from users, and a display device, printer, and the like as an output device that presents the processing results of the packet relay device 100 to users.

In FIG. 1, the input/output device 610 is depicted as a device independent of the packet relay device 100, but the packet relay device 100 may be equipped with the input/output device 610, such as a display, operation buttons, or the like.

The packet transfer part 300 includes a whitelist storage H/W (hardware) memory 310, a destination determining part 320, a transfer table memory 330, and a transfer setting memory 340. Examples of the whitelist storage H/W memory 310 include a CAM (content addressable memory) and DRAM (dynamic random access memory), and the whitelist storage H/W memory 310 stores therein a whitelist generated by the S/W controller 400. The whitelist storage H/W memory 310 is a memory with limited capacity, and therefore, the number of entries in the whitelist that can be stored has an upper limit. This upper limit is referred to as the storage condition below.

The transfer table memory 330 is a CAM or a DRAM, for example, and stores therein information that indicates a correspondence relationship between the header information of a packet and the destination thereof, i.e., packet transmitter 500. This information is created by an administrator or the like, and stored in the transfer table memory 330 in advance. Examples of the information indicating the correspondence relationship include a mac address table used for the communications of Layer 2 of the OSI (open systems interconnection) reference model and a routing table used for the communications of Layer 3 of the OSI reference model.

The transfer setting memory 340, for example, is a DRAM and stores therein setting information, such as the mode and status of the packet relay device 100 as well as the operation for a whitelist unregistered packet, which is described below. The setting information stored in the transfer setting memory 340 is configured by an administrator or the like through the input/output device 610.

The destination determining part 320 receives a packet from each packet receiver 200, and by searching the transfer table memory 330 based on the header information of the received packet, determines the destination of the received packet.

When the destination determining part 320 receives a packet during the whitelist operating state, which is described later, the destination determining part 320 searches the whitelist stored in the whitelist storage H/W memory 310 and determines whether the received packet is registered in the whitelist. If the received packet is not registered in the whitelist, the destination determining part 320 conducts, on the packet, a process indicated by the operation settings for a whitelist unregistered packet, which are stored in the transfer setting memory 340. The whitelist operating status is also simply referred to the operating status below.

When the destination determining part 320 receives a packet during the whitelist generating state, which is described below, the destination determining part 320 extracts predetermined header information and predetermined control information from the received packet, and sends the information to the S/W controller 400. The destination determining part 320 conducts several processes to determine whether or not communications using the whitelist need to be performed, or the like, based on the setting content of the transfer setting memory 340. The whitelist generating state is also simply referred to the generating state below.

The packet transfer part 300 is generally constituted of hardware in order to perform simple commands rapidly such as rapid search through the whitelist or communications at the wire-speed of packets. The packet transfer part 300 may be constituted of FPGA (Field Programmable Gate Array) or the like, for example.

The S/W controller 400 includes a CPU (control processing unit) 410 and an S/W memory 420. The CPU 410 includes a processor that runs programs stored in the S/W memory 420. The S/W memory 420 includes a ROM (read only memory) that is a non-volatile storage device, and a RAM (random access memory) that is a volatile storage device. ROM stores therein non-variable programs (such as BIOS (basic input/output system)) and the like. RAM is a high-speed volatile storage device such as a DRAM, and temporarily stores programs for the processor to run and data used to run the programs.

The S/W memory 420 includes a whitelist generating program 421, a transfer setting program 425, a priority storage S/W memory area 422, a whitelist storage S/W memory area 423, and a generated whitelist counter by packet receiver number 424.

The programs stored in the S/W memory 420 are run by the processor, and as a result, a predetermined process is performed using storage devices, communication ports (communication devices), and the like. Thus, in the descriptions of this embodiment and other embodiments where a program is the subject of the sentence, the term "program" may be replaced with "processor." A process conducted by a program is a process conducted by a computer or computing system that runs the program.

The processor operates in accordance with the programs, thereby operating as a function part that achieves a predetermined function. For example, when the processor operates in accordance with the whitelist generating program 421, the processor functions as a whitelist generating part, and when the processor operates in accordance with the transfer setting program 425, the processor functions as a transfer setting part. The processor also operates as a function part that achieves each of a plurality of processes conducted by respective programs. The computer and computing system are a device and system that include those function parts.

The whitelist generating program 421 generates a whitelist based on the control information and the header information received from the destination determining part 320. The storage condition of the whitelist storage H/W memory 310 is written in the whitelist generating program 421 in advance, for example. Alternatively, the whitelist generating program 421 may obtain the capacity of the whitelist storage H/W memory 310 and calculate the storage condition at startup of the packet relay device 100, for example.

The whitelist generating program 421 monitors the usage of the whitelist storage S/W memory area 423, and integrates entries of the whitelist stored in the whitelist storage S/W memory area 423 as necessary in accordance with a predetermined algorithm. "Integrate" here means to group at least one entry of the whitelist into one entry. The predetermined algorithm for integrating the entries is written in the whitelist generating program 421 in advance.

The transfer setting program 425 writes, in the transfer setting memory 340 and/or white list generating program 421, the transfer settings inputted through the input/output device 610. The transfer setting program 425 stores the priority information inputted through the input/output device 610, which is described later, in the priority storage S/W memory area 422.

The priority storage S/W memory area 422 stores therein the priority information. The whitelist storage S/W memory area 423 temporarily stores therein the whitelist generated by the whitelist generating program 421. The whitelist storage S/W memory area 423 is greater than the memory area of the whitelist storage H/W memory 310.

The generated whitelist counter by packet receiver number 424 counts the number of entries in the whitelist stored in the whitelist storage S/W memory area 423 for each packet receiver 200 that has received the packets corresponding to those entries.

FIG. 2 is an example of the whitelist stored in the whitelist storage H/W memory 310 and the whitelist storage S/W memory area 423. In the example of FIG. 2, the whitelist includes "n" number of entries. Each entry of the whitelist includes a plurality of parameters. The plurality of parameters are each control information or header information that was extracted by the destination determining part 320 from the packet received through the packet receiver 200.

The entry 700 is an example of an entry included in the whitelist. The entry 700 includes a packet receiver number 701 and a VLAN number 702, which are parameters respectively indicating the control information of the packet, for example. The entry 700 includes, as parameters indicating the header information of the packet, source mac address 703, destination mac address 704, protocol 705, source IP address 706, destination IP address 707, source port number 708, and destination port number 709.

The packet receiver number 701 uniquely identifies each packet receiver 200. A packet receiver 200 that has received a packet is identified based on the packet receiver number 701. If a packet transmitter-receiver that has the functions of the packet receiver 200 and the packet transmitter 500 is used, the packet receiver number 701 is a packet transmitter-receiver number that uniquely identifies each packet transmitter-receiver. The VLAN number 702 uniquely identifies VLAN to which the packet receiver 200 belongs.

Source mac address 703 indicates the source mac address of a packet. Destination mac address 704 indicates the destination mac address of a packet. Protocol 705 indicates the protocol type. Source IP address 706 indicates the source IP address of a packet. Destination IP address 707 indicates the destination IP address of a packet. Source port number 708 indicates the source port number of a packet. Destination port number 709 indicates the destination port number of a packet. The port number in this example means a number that identifies a program (application, software) used for transmitting and receiving a packet.

The content of the entry 700 is not limited to the example of FIG. 2 as long as it includes at least one parameter that indicates the control information, and a plurality of types of parameters that indicate the header information. The entry 700 may also include header information, such as TOS (type of service), flag, TTL (time to live), ID, version, and header values in addition to or in place of the header information described above.

Figure 3:
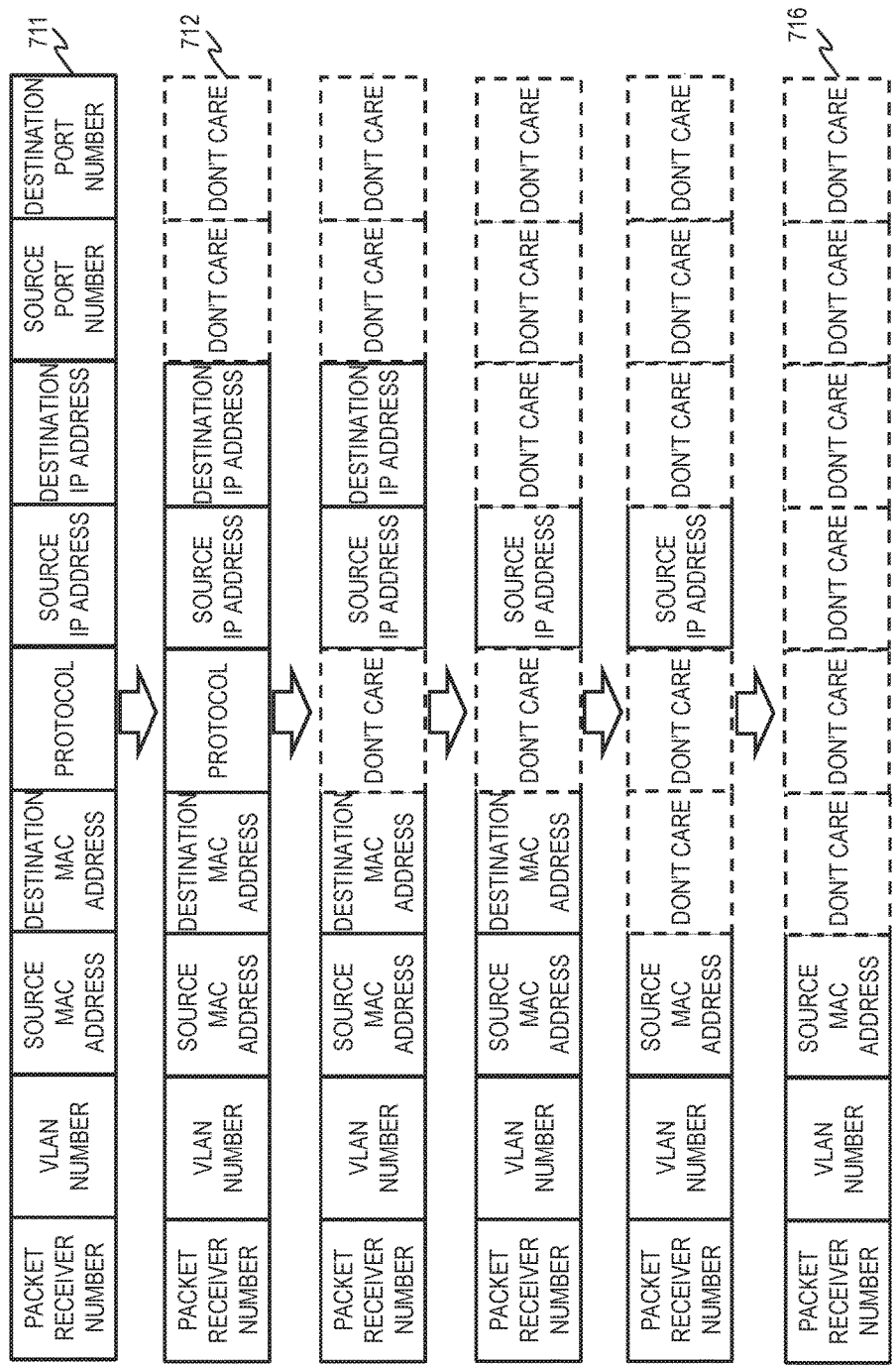
FIG. 3 is an explanatory diagram depicting an example of an algorithm to integrate entries of the whitelist according to Embodiment 1.

FIG. 3 is a diagram for explaining an example of the algorithm to integrate the entries of the whitelist shown in FIG. 2. In this embodiment, the whitelist generating program 421 integrates at least one entry that has the same packet receiver number. The timings at which the whitelist generating program 421 integrates the entries will be described later.

The whitelist generating program 421 masks some of the parameters indicating the header information in the entries that have a target packet receiver number for integration, for example, and integrates multiple entries in which the same parameters are masked into one entry. Masking a parameter means replacing the parameter with "Don't care" information.

An entry state 711 indicates the state of an entry that has not been integrated. When at least one entry having the target packet receiver number for integration are represented by the entry state 711, the whitelist generating program 421 integrates the entries by masking one of the source port number and the destination port number based on the frequency occurrence in the respective entries.

If entries need to be further integrated after the entries are integrated by masking one of the source port number and the destination port number, the whitelist generating programs 421 integrates the entries by masking the other of the two numbers. An entry state 712 shows the state of an entry in which both of the source port number and destination port number are masked and replaced with "Don't Care" information.

If the entries need to be further integrated, the whitelist generating program 421 successively masks different parameters in the following order: the protocol; the destination IP address; the destination mac address; and the source IP address. When all of the integrations specified by the integration algorithm have been conducted on all entries having the target packet receiver number for integration (when the entries have the state represented by an entry state 716 in the example of the integration algorithm of FIG. 3), those entries are considered to have reached the integration limit.

In the integration process, the parameter indicating the control information may also be masked. There is no limitations on the order to mask the parameters indicating the control information or header information in the integration process, but it is preferable to start from a parameter that is less likely to cause degradation of the security level as a result of the entry integration as in the integration algorithm of FIG. 3. If there are a plurality of parameters that have the same level of effects in terms of degrading the security level as a result of the integration of entries (source port number and destination port number, for example), the whitelist generating program 421 can reduce the number of entries by masking a parameter having a greater number of value types as in the integration algorithm of FIG. 3.

FIG. 3 shows as the integration limit the entry state in which only one parameter that indicates header information, among the parameters indicating the header information, is left unmasked, but the integration limit may alternatively be the entry state in which multiple parameters that indicate a plurality of types of header information are left unmasked. The whitelist generating program 421 may also mask a plurality of types of parameters at once. Alternatively, instead of masking parameters, the whitelist generating program 421 may replace the value of each parameter with a range that covers the values of all applicable parameters of the entries having the target packet receiver number for integration.

Figure 4A:
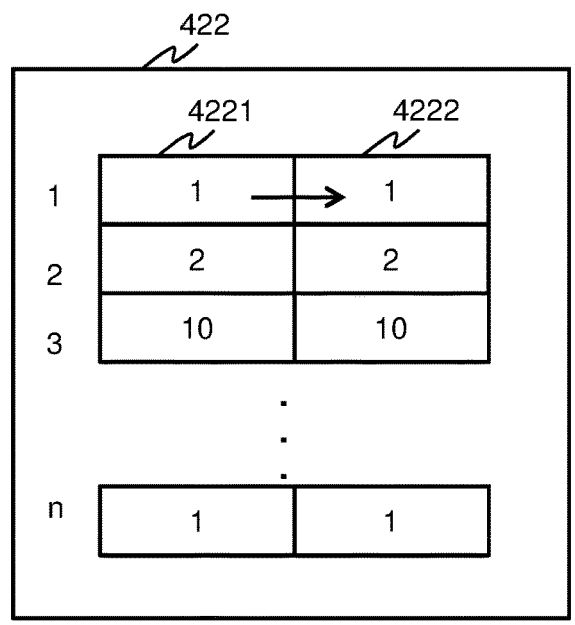
FIG. 4A is an example of priority information stored in a priority storage software (S/W) memory area according to Embodiment 1.

FIG. 4A is an example of the priority information stored in the priority storage S/W memory area 422. The priority storage S/W memory area 422 includes priority fields 4221 and 4222. The priority fields 4221 and 4222 have entries in which the packet receiver numbers (1 to n) are used as indexes, and store therein the priority of a packet receiver 200 corresponding to each index.

The priority field 4221 stores therein the priority values inputted by an administrator or the like through the input/output device 610. The priority field 4222 stores therein the values of the priority field 4221 at a point in time when the transfer setting program 425 receives a whitelist function state setting command for switching the whitelist function state from the generating state to the operating state.

The priority fields 4221 and 4222 of FIG. 4A show that the priority of the packet receiver 200 with the packet receiver number 1 is 1, the priority of the packet receiver 200 with the packet receiver number 2 is 2, the priority of the packet receiver 200 with the packet receiver number 3 is 10, and the priority of the packet receiver 200 with the packet receiver number n is 1. In this embodiment, the priority is represented with the scale of 1 to 10 inclusive, but there is no limitations on the scale representing the priority. The greater the priority value is, the higher the priority of the packet receiver 200 is, or in other words, the higher the security level is. Alternatively, the priority may be configured such that the smaller the value thereof, the higher the priority of the packet receiver 200. Furthermore, different packet receivers 200 may have the same priority level.

For example, the priority of the packet receiver 200 connected to a terminal that performs important communications (such as PLC (programmable logic controller) in the control network) can be set to a high level, and the priority of packet receivers 200 connected to other terminals (such as typical PC (personal computer) in the control network) can be set to a low level.

By setting the priority in this manner, the whitelist generating program 421 integrates entries that correspond to the packet receivers 200 connected to the low-priority terminals preferentially when the number of entries in the whitelist exceeds the storage condition, and therefore, it is possible to maintain the security level of the terminal that performs important communications.

Figure 4B:
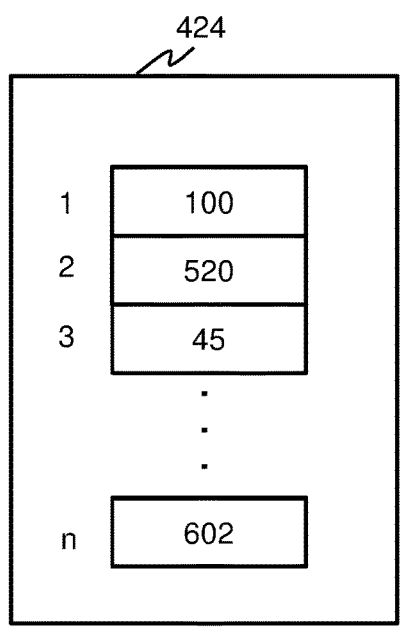
FIG. 4B is an example of counter values held by a generated whitelist counter by packet receiver number according to Embodiment 1.

FIG. 4B is an example of counter values held by the generated whitelist counter by packet receiver number 424. The generated whitelist counter by packet receiver number 424 has entries in which the packet receiver numbers are used as indexes, and stores therein the number of entries in a whitelist corresponding to each index. In FIG. 4B, the number of entries corresponding to the packet receiver 200 with the packet receiver number 1 is 100, the number of entries corresponding to the packet receiver 200 with the packet receiver number 2 is 520, the number of entries corresponding to the packet receiver 200 with the packet receiver number 3 is 45, and the number of entries corresponding to the packet receiver 200 with the packet receiver number "n" is 602.

FIG. 5 shows an example of the transfer setting information stored in the transfer setting memory 340. The transfer setting information may also be written in the whitelist generating program 421. The transfer setting information includes stored information 501 that indicates the type of transfer settings, stored content 502 that indicates the state of the stored information 501, and an initial state 503 that indicates the initial state of the stored content 502. In FIG. 5, each cell of the stored content 502 have a plurality of values separated by /, but in the actual configuration, one of those plurality of values is stored. The initial state 503 stores therein one of the plurality of values written in the corresponding stored content 502. Below, a schematic example of the operation of the packet relay device 100 in accordance with the transfer setting information is explained.

When receiving a packet, the destination determining part 320 determines whether the stored content 502 of a record 504 is the whitelist switch mode or normal switch mode. In the whitelist switch mode, the whitelist function is enabled, and in the normal switch mode, the whitelist function is disabled.

If the stored content 502 of the record 504 is the normal switch mode, the destination determining part 320 searches the transfer table memory 330 based on the header information of the received packet. The destination determining part 320 then determines the destination based on the search result, and transfers the packets to the destination.

When the stored content 502 of the record 504 is the whitelist switch mode, the destination determining part 320 determines whether the stored content 502 of a record 505 is the generating state for generating a whitelist, or the operating state for transferring packets using the whitelist.

Below, an operation example when the stored content 502 of the record 505 is the generating state is explained. The destination determining part 320 conducts a process similar to the packet transfer process of the normal switch mode on the received packet, and sends predetermined header information and predetermined control information of the received packet to the whitelist generating program 421. The whitelist generating program 421 generates a whitelist based on the control information and header information received from the destination determining part 320.

The whitelist generating program 421 integrates the entries of a whitelist that is being generated as necessary. The whitelist generating program 421 refers to the stored content 502 of a record 509 in integrating the entries. If the stored content 502 of the record 509 is "enabled," the whitelist generating program 421 outputs to the input/output device 610 a log that indicates that the entry integration has been conducted.

Below, an operation example when the stored content 502 of the record 505 is the operating state is explained. The destination determining part 320 determines whether the packet received through the packet receiver 200 is registered in the whitelist stored in the whitelist storage H/W memory 310 or not. If the packet is registered in the whitelist, the destination determining part 320 conducts a process similar to the packet transfer process of the normal switch mode on the received packet.

If the packet is not registered in the whitelist, the destination determining part 320 conducts a process indicated by the stored content 502 of a record 506 on the packet. Examples of the process indicated by the stored content 502 of the record 506 include discarding the packet, allowing through the packet, which is similar to the packet transfer process of the normal switch mode, and transferring the packet to a specific packet transmitter 500.

In this process, the destination determining part 320 refers to the stored content 502 of a record 507. If the stored content 502 of the record 507 is "enabled," the destination determining part 320 sends predetermined control information and predetermined header information of the packet to the transfer setting program 425. The transfer setting program 425 outputs to the input/output device 610 the control information and the header information as a log.

The destination determining part 320 may also be configured to refer to the stored content 502 of a record 508 after receiving a packet from the packet receiver 200, and determine whether the value corresponding to the packet receiver number included in the received packet is "applicable" or "non-applicable." If the value corresponding to the packet receiver number included in the received packet is "non-applicable," the destination determining part 320 conducts a process similar to the normal switch mode on the packet regardless of the remaining parts of the setting information.

Below, a case in which the stored content 502 of the record 507 is "enabled," and the packet transmitter 500 is connected to the Syslog server or SNMP (simple network management protocol) server is explained as an example. In this case, when the destination determining part 320 receives a whitelist unregistered packet, the destination determining part 320 may send the packet to the packet transmitter 500, and outputs a log that indicates that a whitelist unregistered packet was received using the Syslog function by the Syslog server, or the Trap function by the SNMP server.

FIG. 6 shows an example of a list of commands related to the transfer settings, which are received by the transfer setting program 425 through the input/output device 610. The list of commands related to the transfer settings includes a command type 1101 indicating the type of commands, setting content 1102 indicating the setting content of a command indicated by the command type 1101, and an initial state 1103 indicating the initial state of the setting content 1102, for example.

The respective commands of records 1104 to 1109 are commands for changing the respective transfer settings of the records 504 to 509. The command type 1101, setting content 1102, and initial state 1103 of the records 1104 to 1109 respectively correspond to the stored information 501, stored content 502, and initial state 503 of the records 504 to 509.

The command of the record 1110 is a command to cause the transfer setting program 425 to set the priority in each cell of the priority field 4221. The command of the record 1111 is a command to cause the whitelist generating program 421 to display the generated whitelist in the input/output device 610.

FIG. 7A is an example of a log for a whitelist unregistered packet. The log for a whitelist unregistered packet 1201 includes information indicating that the destination determining part 320 received a packet that is not registered in the whitelist, the control information of the packet, and the header information of the packet, for example.

FIG. 7B is an example of an entry integration log. The entry integration log 1202 includes information indicating that the whitelist generating program 421 has integrated entries, the packet receiver number for which the entries were integrated, and the number of entries in the whitelist after integration, for example.

FIG. 7C is an example of a whitelist log displayed in the input/output device 610 by the whitelist generating program

421. The whitelist log 1203 includes parameters of each entry in the whitelist. In the whitelist log 1203, the parameters with "D" represent "Don't Care," which means that those parameters were masked and the entries with such parameters were integrated.

The numbers displayed in the matched packet column indicate the number of packets corresponding to those entries, which were received by the destination determining part 320 in the generating state. In the whitelist log 1203, the entry #1 and entry #4, for example, are the entries generated from the packets received by the packet receiver 200 with the packet receiver number 1, and have the same values in SMAC (source mac address), DMAC (destination mac address), SIP (source IP address), and DIP (destination IP address).

When the whitelist generating program 421 integrates entries corresponding to the packet receiver 200 with the packet receiver number 1, by masking Sport (source port number), for example, the entries #1 and #4 become identical entries. In this case, the whitelist generating program 421 deletes one of the entries #1 and #4 as an unnecessary entry, thereby performing entry integration.

Below, an example of the process in which the packet relay device 100 of this embodiment generates a whitelist is explained in detail. As described above, the destination determining part 320, the whitelist generating program 421, and the transfer setting program 425 refer to the setting information stored in the stored content 502 of the transfer setting memory 340 to conduct processes as necessary, but in the descriptions below, the referring process is not explained.

The stored content 502 may be written in the whitelist generating program 421, but the descriptions below are for the case in which the transfer setting program 425 stores the received transfer settings in the transfer setting memory 340, and the destination determining part 320, whitelist generating program 421, and transfer setting program 425 refer to the stored content 502 in the transfer setting memory 340.

Figure 8:
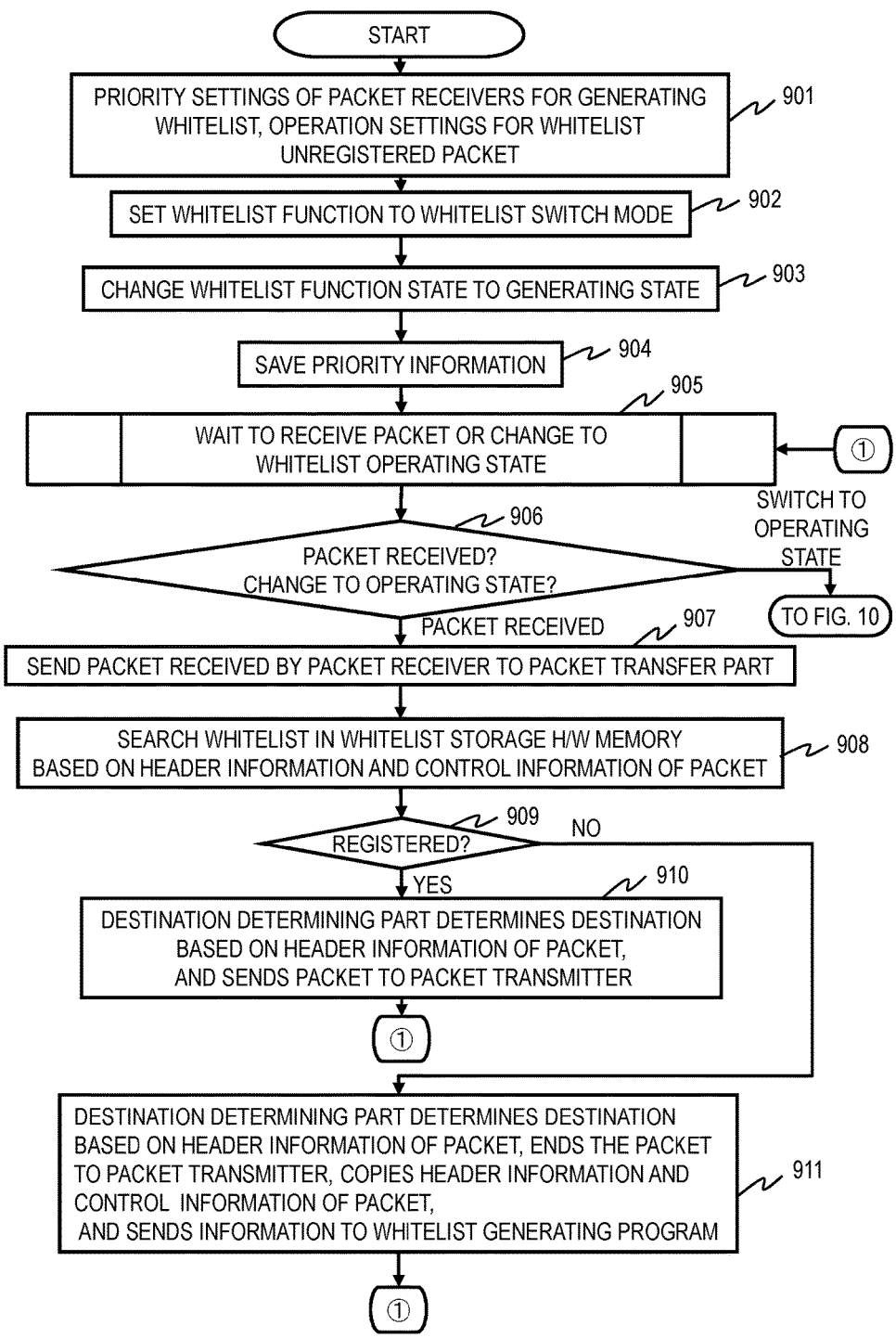
FIG. 8 is a flowchart depicting an operation example of the packet relay device up to start of a generating state, and an operation example of the packet transfer part during the generating state according to Embodiment 1.

FIG. 8 is a flowchart depicting the operation example of the packet relay device 100 of this embodiment up to the start of the generating state, and the operation example of the packet transfer part 300 during the generating state. In the example of FIG. 8, all packet receivers 200 are subjected to the whitelist generation.

The transfer setting program 425 receives a priority setting command for each packet receiver from the input/output device 610, stores the priority of each packet receiver 200 indicated by the priority setting command for each packet receiver in the priority field 4221, and sets the priority for generating a whitelist of each packet receiver 200. The transfer setting program 425 also receives an operation setting command for a whitelist unregistered packet and a log output setting command for a whitelist unregistered packet, stores in the transfer setting memory 340 the setting content indicated by the operation setting command for a whitelist unregistered packet and the log output setting command for a whitelist unregistered packet, and configures the operation for a whitelist unregistered packet (Step 901).

The transfer setting program 425 receives from the input/output device 610 a whitelist function setting command that switches the whitelist function to the whitelist switch mode, stores in the transfer setting memory 340 the setting content indicated by the whitelist function setting command, and sets the whitelist function to the whitelist switch mode (Step 902). The transfer setting program 425 receives from the input/output device 610 a whitelist function state setting command that changes the whitelist function state to the generating state, stores in the transfer setting memory 340 the setting content indicated by the whitelist function state setting command, and switches the whitelist function state to the generating state (Step 903).

The whitelist function state is set to the operating state while the process of Step 902 and the process of Step 903 are conducted. Thus, during this period, if the whitelist storage H/W memory 310 already has a whitelist therein, the destination determining part 320 determines a process to be conducted on the received packet in accordance with the whitelist. If the whitelist storage H/W memory 310 does not have a whitelist, the destination determining part 320 transfers the received packet as a whitelist unregistered packet during the period mentioned above.

The transfer setting program 425 saves the priority information by copying the information in the priority field 4221 into the priority field 4222 (Step 904). Then the process enters a stand-by state until one of the packet receivers 200 receives a packet, or the transfer setting program 425 receives the whitelist function state setting command for switching the whitelist function state to the operating state from the input/output device 610 (Step 905).

If the transfer setting program 425 receives the whitelist function state setting command for switching the whitelist function state to the operating state from the input/output device 610 (Step 906: Switch to the operating state), the process moves to the flow shown in FIG. 10. If one of the packet receivers 200 receives a packet (Step 906: Receive a packet), the packet receiver 200 sends the received packet to the packet transfer part 300 (Step 907).

The destination determining part 320 of the packet transfer part 300 searches the whitelist in the whitelist storage H/W memory 310 based on predetermined header information and predetermined control information of the received packet (Step 908). The destination determining part 320 determines whether an entry including the header information and control information is registered in a whitelist or not (Step 909).

If the entry including the header information and control information is already registered in the whitelist (Step 909: YES), the destination determining part 320 searches the transfer table memory 330 based on the header information of the packet. That is, the destination determining part 320 determines a packet transmitter 500 to which the packet is to be transferred based on the header information in the packet, and transfers (sends) the packet to the destination packet transmitter 500 (Step 910). Thereafter, the process returns to Step 905.

If the entry including the header information and the control information is not registered in the whitelist (Step 909: NO), in a manner similar to the process of Step 910, the destination determining part 320 determines a destination of the packet based on the header information of the packet and transfers (sends) the packet to the corresponding packet transmitter 500. Also, the destination determining part 320 sends a copy of the header information and control information of the packet to the whitelist generating program 421 (Step 911). Thereafter, the process returns to Step 905.

Figure 9:
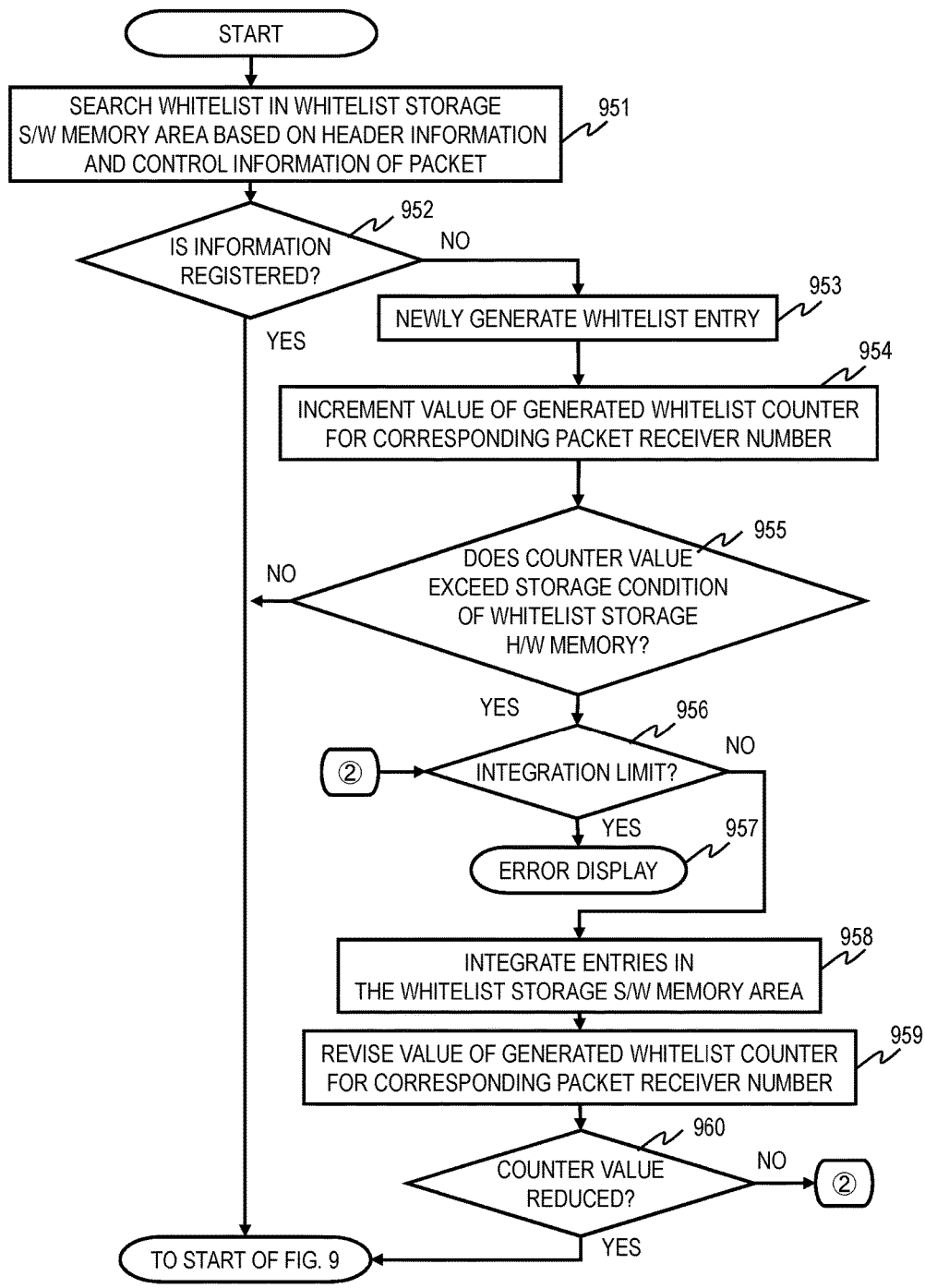
FIG. 9 is a flowchart depicting an example of a whitelist generating process conducted by the whitelist generating program according to Embodiment 1.

FIG. 9 is a flowchart depicting an example of the whitelist generating process conducted by the whitelist generating program 421. After receiving the header information and control information from the destination determining part 320, the whitelist generating program 421 searches a whitelist in the whitelist storage S/W memory area 423 based on the header information and control information of the received packet (Step 951).

The whitelist generating program 421 determines whether an entry including the header information and control information is registered in the whitelist in the whitelist storage S/W memory area 423 or not (Step 952). If an entry including the header information and control information is registered in the whitelist (Step 952: YES), the whitelist generating program 421 returns to the start of FIG. 9, and wait until receiving header information and control information.

If an entry including the header information and control information is not registered in the whitelist (Step 952: NO), the whitelist generating program 421 generates a new entry of the whitelist corresponding to the header information and the control information (Step 953). The whitelist generating program 421 stores the generated entry in the whitelist in the whitelist storage S/W memory area 423.

In Step 953, the whitelist generating program 421 selects the entry state of a new entry to be generated based on the integration state of the entries including the same control information as the new entry in the whitelist of the whitelist storage S/W memory area 423. Specifically, when entries in which the packet receiver number 701 is 1 in the whitelist have been integrated several times already and are in the state represented by the entry state 714, for example, if the packet receiver number 701 of the new entry to be generated is 1, the whitelist generating program 421 generates an entry so as to have the same state as the entry state 714.

The whitelist generating program 421 increments the counter value of the generated whitelist counter by packet receiver number 424 of the packet receiver number that received the packet corresponding to the newly generated entry (Step 954).

The whitelist generating program 421 determines whether the incremented counter value exceeds the storage condition of the whitelist storage H/W memory 310 or not (Step 955). If the counter value does not exceed the storage condition (Step 955: NO), the whitelist generating program 421 ends the process. If the counter value exceeds the storage condition (Step 955: YES), the whitelist generating program 421 determines whether entries in the whitelist in the whitelist storage S/W memory area 423 having the same packet receiver number 701 as the packet receiver number corresponding to the incremented counter value have reached the integration limit or not (Step 956).

For example, in a case in which the whitelist generating program 421 integrates entries in accordance with the algorithm of FIG. 3, if the entries have been integrated to an entry state 716, the whitelist generating program 421 determines that the integration limit has been reached. If the entries are represented by one of the entry states 711 to 715, the whitelist generating program 421 determines that the integration limit has not been reached.

If the whitelist generating program 421 determines that the integration limit has been reached (Step 956: YES), the number of entries of the whitelist exceeds the storage condition, and therefore, the whitelist cannot be generated. Thus, the whitelist generating program 421 displays an error in the input/output device 610, and ends the process (Step 957). This error can be addressed by conducting a whitelist generating process again using the packet relay device 100 that includes the whitelist storage H/W memory 310 with a greater storage condition, for example.

If the whitelist generating program 421 determines that the integration limit has not been reached (Step 956: NO), the whitelist generating program 421 integrates entries of the whitelist in the whitelist storage S/W memory area 423 in accordance with a predetermined algorithm (Step 958). The whitelist generating program 421 revises the counter value of the generated whitelist counter by packet receiver number 424 of the packet receiver number corresponding to the integrated entries, based on the number of entries after the integration (Step 959).

The whitelist generating program 421 determines whether the counter value has reduced or not as a result of the integration (Step 960). If the counter value has reduced (Step 960: YES), the whitelist generating program 421 returns to the start of FIG. 9, and waits until receiving header information and control information. If the counter value has not reduced (Step 960: NO), the whitelist generating program 421 returns to Step 956. In FIG. 9, the processes of Step 954 to Step 960 may be omitted.

Figure 10:
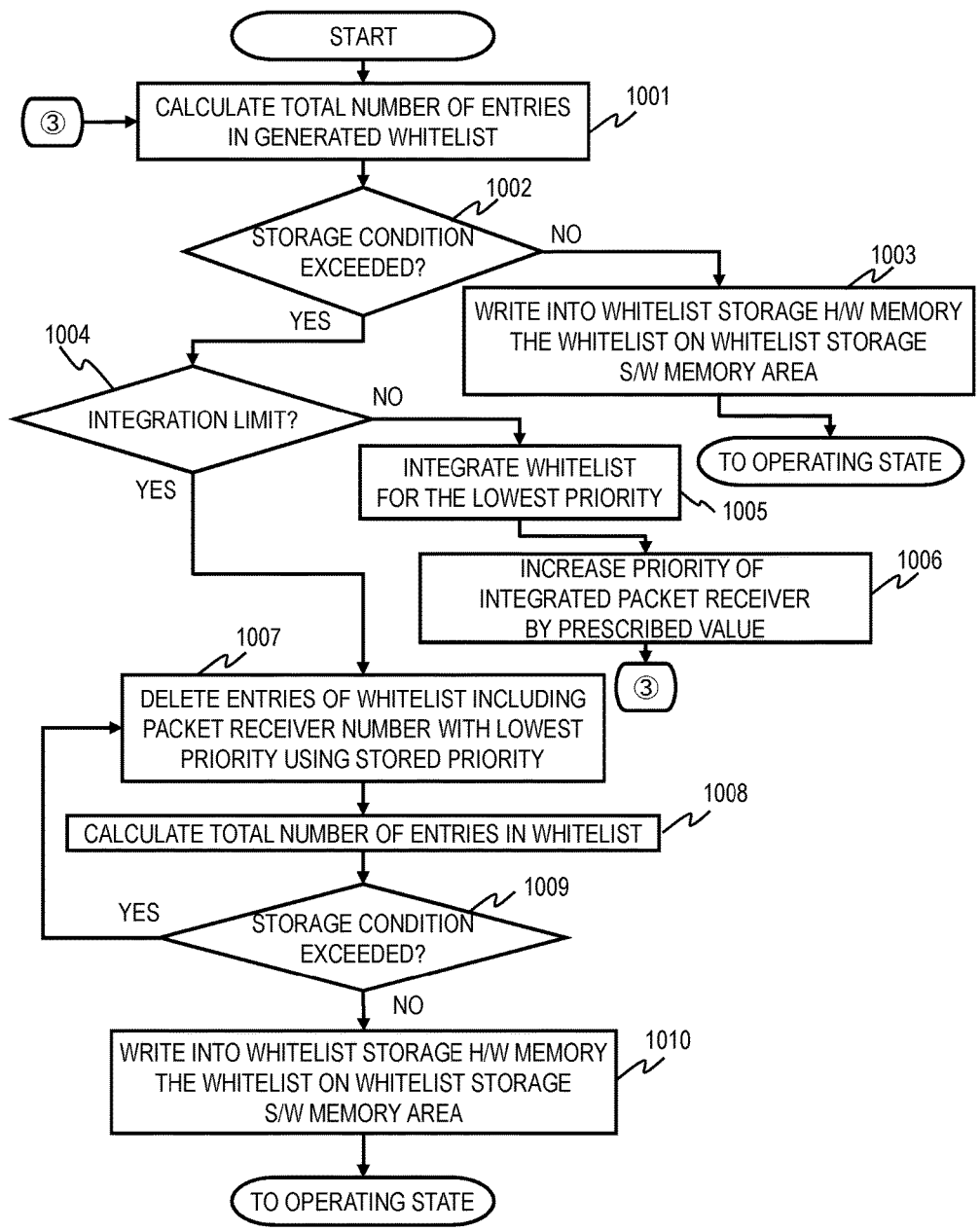
FIG. 10 is a flowchart depicting an example of the process conducted by the packet relay device for switching from the generating state to the operating state according to Embodiment 1.

FIG. 10 is a flowchart depicting an example of the process conducted by the packet relay device for switching from the generating state to the operating state when the switch to the operating state was determined in Step 906 of FIG. 8. The whitelist generating program 421 adds up the counter values of all the packet receiver numbers in the generated whitelist counter by packet receiver number 424, thereby calculating the total number of entries in the generated whitelist (Step 1001).

The whitelist generating program 421 determines whether the calculated total number of entries exceeds the storage condition or not (Step 1002). If the whitelist generating program 421 determines that the total number of entries does not exceed the storage condition (1002: NO), the whitelist generating program 421 writes into the whitelist storage H/W memory 310 the whitelist on the whitelist storage S/W memory area 423 (Step 1003). Next, the transfer setting program 425 switches the whitelist function state recorded in the transfer setting memory 340 to the operating state.

If the whitelist generating program 421 determines that the total number of entries, which was calculated in Step 1001, exceeds the storage condition (1002: YES), the whitelist generating program 421 determines whether all entries of the whitelist in the whitelist storage S/W memory area 423 have reached the integration limit or not (Step 1004).

If the whitelist generating program 421 determines that there are entries that have not reached the integration limit (Step 1004: NO), the whitelist generating program 421 integrates entries of the whitelist with the packet receiver number having the lowest priority, which is stored in the priority field 4221, among the entries that have not reached the integration limit, for example (Step 1005).

If a plurality of packet receiver numbers have the lowest priority level, the whitelist generating program 421 may select one packet receiver number randomly or select the smallest or largest packet receiver number from the plurality of packet receiver numbers, for example. In Step 1005, the whitelist generating program 421 may integrate entries with the packet receiver number having the priority level lower than a predetermined level, which is stored in the priority field 4221, among the entries that have not reached the integration limit, for example.

After the integration is completed, the whitelist generating program 421 increases the priority level in the priority field 4221 of the packet receiver corresponding to the entries that have been integrated by incrementing the priority level by a predetermined value (Step 1006), and returns to Step 1001.

If the whitelist generating program 421 determines that all entries have reached the integration limit (Step 1004: YES), entries cannot be integrated, and therefore, among the entries included in the whitelist, the whitelist generating program 421 deletes entries including the packet receiver number of the lowest priority, which is stored in the priority field 4222, from the whitelist, for example (Step 1007).

In Step 1007, the whitelist generating program 421 may delete a predetermined number of entries randomly selected from the entries including the packet receiver number that has the lowest priority, which is stored in the priority field 4222, for example. Alternatively, in Step 1007, the whitelist generating program 421 may delete entries with the packet receiver number having the priority lower than a predetermined level, which is stored in the priority field 4222, among the entries included in the whitelist, for example.

The whitelist generating program 421 calculates the total number of entries in the whitelists after entries were deleted in Step 1007 in a manner similar to Step 1001 (Step 1008). The whitelist generating program 421 determines whether the total number of entries exceeds the storage condition or not in a manner similar to Step 1002 (Step 1009).

If the whitelist generating program 421 determines that the total number of entries calculated in Step 1008 does not exceed the storage condition (Step 1009: NO), the whitelist generating program 421 writes into the whitelist storage H/W memory 310 the whitelist on the whitelist storage S/W memory area 423 in a manner similar to Step 1003 (Step 1010). Next, the transfer setting program 425 switches the whitelist function state recorded in the transfer setting memory 340 to the operating state.

If the whitelist generating program 421 determines that the total number of entries calculated in Step 1008 exceeds the storage condition (Step 1009: YES), the process returns to Step 1007.

FIG. 11 is an example of the packet information generated by the destination determining part 320. Packet information 1301 and 1302 is constituted of predetermined control information and predetermined header information extracted by the destination determining part 320 from the packets received by the packet receivers 200. The destination determining part 320 searches the whitelist based on the control information and header information included in the packet information 1301 and 1302 in the operating state.

The packet information 1301 is information identical to the entry #2 shown in the whitelist log 1203 of FIG. 7C except for the Sport information, which is masked in the log (and matched packets information). Thus, the destination determining part 320 transfers the packet corresponding to the packet information 1301 as the packet registered in the whitelist.

On the other hand, the packet information 1302 does not match any of the entries in the whitelist log 1203. Thus, the destination determining part 320 processes the packet corresponding to the packet information 1302 as a packet not registered in the whitelist in accordance with the operation setting for a whitelist unregistered packet.

In the packet relay device 100 of this embodiment, entries of a whitelist including a plurality of types of header information are generated, and as a result, it is possible to make a whitelist from detailed communication information in authorized terminals. Thus, even in the situations where an authorized terminal is infected with malware, operated by a malicious user, or the like, for example, the packet relay device 100 can block the communications between terminals that are not performed in the normal situation or communications that perform a malicious command.

The packet relay device 100 integrates the list based on the storage condition of the whitelist storage H/W memory 310 and the priority of each packet receiver 200. In this way, the packet relay device 100 can generate a whitelist that has an appropriate security level corresponding to the priority level set for each packet receiver and the storage condition. In other words, a whitelist with a high security level can be generated. In the packet relay device 100, the whitelist generating process can be automatically performed, and therefore, it is possible to save trouble of an administrator.

Embodiment 2

The packet relay device 100 of this embodiment conducts the entry integration process of Steps 954 to 960 and Steps 1005 to 1007 for each VLAN number instead of each packet receiver 200. In this embodiment, the priority storage S/W memory area 422 stores the priority level for each VLAN number. The generated whitelist counter by packet receiver number 424 stores the counter value for each VLAN number.

Embodiment 3

The packet relay device 100 of this embodiment selects one of the packet receiver 200 and the VLAN number as the basis of the whitelist integration by a command from the input/output device 610. In this embodiment, the transfer setting memory 340 stores the setting information that indicates the whitelist integration is conducted based on the packet receiver 200 or the VLAN number. The priority storage S/W memory area 422 stores the priority for each packet receiver number and each VLAN number. The generated whitelist counter by packet receiver number 424 stores the counter value for each packet receiver number and each VLAN number.

Embodiment 4

The packet relay device 100 of this embodiment may have a physical interface such as a button or keyhole, for example, such that the settings of whitelist function and the like may be controlled by the interface. For example, the packet relay device 100 is configured such that the whitelist function mode is determined by turning on and off a button that is controlled by a physical key. In the packet relay device 100 of this embodiment, the settings for the whitelist function and the like can be changed using a physical interface, and therefore, it is possible to enhance the security level.

Embodiment 5

The packet relay device 100 of this embodiment may be configured such that the whitelist generating state and the whitelist operating state are changed between each other when a specific packet receiver 200 is linked up instead of when a command from the input/output device 610 is received. For example, when a specific packet receiver 200 is linked up, the packet relay device 100 enters the generating state. Also, when a predetermined period of time has passed after the link-up, the packet relay device 100 automatically enters the operating state, for example. The packet relay device 100 of this embodiment can switch the whitelist function state without using an input from the outside.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, and processors, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, or an SD card.

The drawings shows control lines and information lines as considered necessary for explanations but do not show all control lines or information lines in the products. It can be considered that almost of all components are actually interconnected.

What is claimed is:

1. A communication apparatus connected to a network comprising a plurality of data receivers that are configured to receive data from the network,
wherein each of the plurality of data receivers belongs to a data receiver group made up of at least one data receiver, and adds, to the received data, control information indicating the data receiver group to which the data receiver belongs,
wherein the communication apparatus further includes:
a controller configured to generate a whitelist based on data received by each of the plurality of data receivers;
a priority storage memory area that stores priority information indicating a priority of each data receiver group; and
a whitelist storage first memory area that stores therein the whitelist, and
wherein the controller is configured to:
receive control information of first data and a plurality of types of header information of the first data, the first data being received by a first data receiver;
select at least one parameter from the plurality of types of header information of the first data based on the priority of a first data receiver group to which the first data receiver belongs and a storage condition, the priority being indicated by the priority information, the storage condition indicating the number of whitelist entries that can be stored in the whitelist storage first memory area; and
add, to the whitelist, an entry that includes control information of the first data and the at least one selected parameter.

2. The communication apparatus according to claim 1, further comprising:
a whitelist storage second memory area configured to store a whitelist generated by the controller, the whitelist storage second memory area being able to store more whitelist entries than the number of whitelist entries specified by the storage condition,
wherein the controller is configured to:
add, to the whitelist stored in the whitelist storage second memory area, an entry that includes the control information of the first data and the at least one selected parameter from the plurality of types of header information of the first data based on the priority of the first data receiver group to which the first data receiver belongs, the priority being indicated by the priority information;
count the number of entries in the whitelist stored in the whitelist storage second memory area when receiving a command to end a generating state for generating a whitelist;
store in the whitelist storage first memory area the whitelist stored in the whitelist storage second memory area if the number of counted entries does not exceed the number of entries specified by the storage condition;
obtain entries that include control information indicating a second data receiver group selected based on a priority of the priority information, from the whitelist stored in the whitelist storage second memory area, if the number of counted entries exceeds the number of entries specified by the storage condition;
mask some of the parameters indicating header information of the respective obtained entries; and
integrate entries in which all parameter values are identical to each other after masking into one entry, among the respective obtained entries.

3. The communication apparatus according to claim 2, wherein, if the counted number of entries exceeds the number of entries specified by the storage condition and if a predetermined parameter in all entries of the whitelist stored in the whitelist storage second memory area is masked, the controller deletes at least one entry that includes control information indicating the second data receiver group, from the whitelist stored in the whitelist storage second memory area.

4. The communication apparatus according to claim 2, wherein each entry of the whitelist stored in the whitelist storage second memory area includes, as a parameter, at least one of source mac address, destination mac address, protocol, source IP address, destination IP address, source port number, and destination port number, and
wherein the controller masks a parameter of the entry that includes at least one of source mac address, destination mac address, protocol, source IP address, destination IP address, source port number, and destination port number in the following order: one of source port number and destination port number; the other of source port number and destination port number; protocol; destination IP address; destination mac address; source IP address; and source mac address.

5. The communication apparatus according to claim 1, further comprising:
a whitelist storage second memory area configured to store a whitelist being generated by the controller, the whitelist storage second memory area being able to store more entries than the number of entries specified by the storage condition,
wherein the controller is configured to:
add, to a whitelist stored in the whitelist storage second memory area, an entry that includes the control information of the first data and parameters selected from the plurality of types of header information of the first data based on the priority of the first data receiver group to which the first data receiver belongs, the priority being indicated by the priority information;
count the number of entries that include control information indicating the first data receiver group in the whitelist stored in the whitelist storage second memory area;
masks some of the parameters indicating header information of respective counted entries if the number of counted entries exceeds the number of entries specified by the storage condition; and integrates entries in which all parameter values are identical to each other after masking into one entry, among the respective counted entries.

6. The communication apparatus according to claim 1, further comprising:

a transfer table memory area that stores transfer information that indicates a correspondence relationship between header information of data and a destination of the data; and a data transfer part configured to transfer data received by the plurality of data receivers by referring to the transfer information, wherein, in a generating state in which the controller generates a whitelist, the data transfer part receives the first data from the first data receiver, extracts the control information and the plurality of types of header information from the first data, sends to the controller the extracted control information and plurality of types of header information, and transfers the first data to a destination corresponding to header information of the first data indicated by the transfer information.

7. The communication apparatus according to claim 1, further comprising:

a transfer table memory area that stores transfer information that indicates a correspondence relationship between header information of data and a destination of the data;

a data transfer part configured to transfer data received by the plurality of data receivers by referring to the transfer information; and a transfer setting memory area configured to store settings for data transfer, wherein the communication apparatus has an operating state in which the data transfer part transfers data using a whitelist stored in the whitelist storage first memory area, wherein the controller receives operation settings for whitelist unregistered data that indicates a first process conducted by the data transfer part on the received data when data not registered in a whitelist stored in the whitelist storage first memory area is received in the operating state, and stores the operation settings for whitelist unregistered data in the transfer setting memory area, wherein the first process is one of discarding the data, transferring the data to a destination corresponding to header information of the data indicated by the transfer information, and transferring the data to a specific destination, and wherein the data transfer part receives second data from a second data receiver in the operation state, and, if the second data is not registered in a whitelist stored in the whitelist storage first memory area, conducts the first process on the second data by referring to the transfer setting memory area.

8. The communication apparatus according to claim 7, wherein the communication apparatus is connected to a display device, wherein the data transfer part sends, to the controller, control information of the second data and header information of the second data, and wherein the controller outputs to the display device the control information and header information of the second data.

9. The communication apparatus according to claim 1, wherein the data receiver group is made up of data receivers belonging to a same VLAN.

10. The communication apparatus according to claim 1, wherein the communication apparatus has a generating state in which a whitelist is generated and an operating state in which data is transferred using a whitelist stored in the whitelist storage first memory area, and wherein the generating state starts when a third data receiver is linked up, and the operating state starts after a predetermined period of time has passed since the link-up.

* * * * *